(12) United States Patent
Yaginuma et al.

(10) Patent No.: US 9,859,581 B2
(45) Date of Patent: Jan. 2, 2018

(54) FUEL CELL (71) Applicant: NISSAN MOTOR CO., LTD., Yokohama-shi, Kanagawa (JP)

(72) Inventors: Motoki Yaginuma, Yokohama (JP); Toshikazu Kotaka, Tokyo (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 468 days.

(21) Appl. No.: 14/384,546

(22) PCT Filed: Mar. 15, 2013

(86) PCT No.: PCT/JP2013/001790
§ 371 (c)(1),
(2) Date: Sep. 11, 2014

(87) PCT Pub. No.: WO2013/136816
PCT Pub. Date: Sep. 19, 2013

(65) Prior Publication Data
US 2015/0030955 A1 Jan. 29, 2015

(30) Foreign Application Priority Data

Mar. 15, 2012 (JP) ................................. 2012-058471
Mar. 19, 2012 (JP) ................................. 2012-061982

(51) Int. Cl.
H01M 2/40 (2006.01)
H01M 8/1004 (2016.01)
(Continued)

(52) U.S. Cl.
CPC ....... *H01M 8/1004* (2013.01); *H01M 8/0232* (2013.01); *H01M 8/0245* (2013.01);
(Continued)

(58) Field of Classification Search
CPC .. H01M 8/1004; H01M 8/242; H01M 8/0232; H01M 8/0245; H01M 8/0258;
(Continued)

(56) References Cited

U.S. PATENT DOCUMENTS 8,293,427 B2 10/2012 Takada et al.
8,628,894 B2 1/2014 Shimazoe et al.
(Continued)

FOREIGN PATENT DOCUMENTS

| CN | 101064366 A | 10/2007 |
| EP | 2 830 131 A1 | 1/2015 |
| JP | 2008-171783 A | 7/2008 |
| JP | 2010-108852 A | 5/2010 |
| JP | 2010-225415 A | 10/2010 |

*Primary Examiner* — Jane Rhee
(74) *Attorney, Agent, or Firm* — Foley & Lardner LLP (57) ABSTRACT A fuel cell includes a membrane electrode assembly, a frame arranged on an outer periphery portion of the membrane electrode assembly, and a separator defining a gas flow channel between the separator and the membrane electrode assembly and between the separator and the frame. A diffuser portion which is a part of the gas flow channel, is formed between the separator and the frame. An electrode layer includes a metal porous body which is an electrode surface layer and has gas permeability. The metal porous body has at an end portion thereof, an extension part covering a region corresponding to the diffuser portion of the frame.

20 Claims, 10 Drawing Sheets (51) Int. Cl.
*H01M 8/242* (2016.01)
*H01M 8/0232* (2016.01)
*H01M 8/0245* (2016.01)
*H01M 8/0258* (2016.01)
*H01M 8/0273* (2016.01)
*H01M 8/04082* (2016.01)
*H01M 8/24* (2016.01)
*H01M 8/1018* (2016.01)

(52) U.S. Cl.
CPC ....... *H01M 8/0258* (2013.01); *H01M 8/0273* (2013.01); *H01M 8/04201* (2013.01); *H01M 8/24* (2013.01); *H01M 8/242* (2013.01); *H01M 2008/1095* (2013.01); *H01M 2250/20* (2013.01); *Y02T 90/32* (2013.01)

(58) Field of Classification Search
CPC .. H01M 8/0273; H01M 8/04201; H01M 8/24; H01M 2008/1095; H01M 2250/20
See application file for complete search history.

(56) References Cited

U.S. PATENT DOCUMENTS

| | | | |
|---|---|---|---|
| 2007/0254200 A1 | 11/2007 | Takada et al. | |
| 2011/0200911 A1* | 8/2011 | Shimazoe | H01M 8/0276 429/482 |
| 2013/0183605 A1* | 7/2013 | Tanaka | H01M 8/0273 429/481 |

* cited by examiner

FUEL CELL

TECHNICAL FIELD

The present invention relates to improvements of a fuel cell such as polymer electrolyte fuel cell (PEFC).

BACKGROUND ART

There has been known a fuel cell described in PTL 1, for example. The fuel cell includes a membrane electrode assembly (MEA) and two separators between which the membrane electrode assembly is sandwiched. In the membrane electrode assembly, an electrolyte membrane is sandwiched between a fuel electrode and an air electrode, and first and second gas diffusion layers are respectively provided on the outer surfaces of the fuel electrode and the air electrode.

In the fuel cell, an end portion of the membrane electrode assembly extends toward the outside of the first and second gas diffusion layers. In the outside of the first and second gas diffusion layers, the end portion of the membrane electrode assembly is sandwiched between elastic gaskets provided on the separators, which prevents deformation of the membrane electrode assembly and displacement of the first and second gas diffusion layers. PTL 1 also discloses that a reinforcement frame may be integrally provided on the outer periphery portion of the membrane electrode assembly.

Also, there has been known a fuel cell described in PTL2, for example. The fuel cell includes a first support member and a second support member which support a polymer electrolyte membrane. The first support member further extends toward an inner side in an in-plane direction in comparison with the second support member. In the fuel cell, the first support member overlaps an outside edge of an electrode opposed to the first support member via the polymer electrolyte membrane.

The fuel cell reinforces the polymer electrolyte membrane using the first support member and the second support member, and prevents shear stress for the polymer electrolyte membrane from occurring even if pressure is applied from an anode electrode side or a cathode electrode side.

CITATION LIST

Patent Literature

PTL 1: Japanese Patent Application Laid-Open Publication No. 2010-108852
PTL 2: Japanese Patent Application Laid-Open Publication No. 2008-171783

SUMMARY OF INVENTION

Technical Problem

It is essential for the fuel cell described in PTL 1 to provide a diffuser portion, which has a certain area where flow of reaction gas is controlled, between the membrane electrode assembly and a manifold to be used for supplying reaction gas to the membrane electrode assembly. The diffuser portion is formed by a frame provided around the outer periphery portion of the membrane electrode assembly.

On the other hand, in the fuel cell described in PTL 1, differential pressure of gas often occurs between a cathode side and an anode side due to a drive situation of the fuel cell and the like, which affects the frame forming the diffuser portion. Namely, in the fuel cell having the diffuser portion, the differential pressure deforms the frame in a thickness direction thereof at the diffuser portion having a relatively large length, which decreases a cross-section area of a gas flow channel on one side to increase pressure loss of reaction gas. Also, the frame repeatedly receives stress by the differential pressure variation to deform in a thickness direction thereof. Thereby, there is a problem that the cross-section area of the gas flow channel on one side is decreased, which increases the pressure loss of reaction gas.

In recent years, a research and development of a thin fuel cell has been promoted to realize a small-sized and high-performance fuel cell. In a case where a thin frame is required to obtain a thin fuel cell, the problem due to the above-described differential pressure becomes more marked.

Further, in the conventional fuel cell such as the fuel cell described in PTL2 having the structure where the support members are provided on both surfaces of the electrolyte membrane, an electrolyte membrane is exposed in a gap between an electrode and a support member. Although the conventional fuel cell reinforces the electrolyte membrane using the support members, it can not avoid the concentration of bending and/or shear stress in an area where the electrolyte membrane is exposed if the supporting members deform due to differential pressure between the cathode side and the anode side. There is a problem that the electrolyte membrane will be damaged due to the concentration.

The present invention, which has been made to solve the conventional problems described above, is directed to provide a fuel cell capable of preventing a frame from deforming due to differential pressure between a cathode side and an anode side thereof. The present invention is also directed to provide a fuel cell capable of reducing stress to be applied to an electrolyte membrane even if differential pressure occurs between a cathode side and an anode side thereof.

Solution to Problem

A fuel cell according to an aspect of the present invention includes: a membrane electrode assembly in which an electrolyte membrane is sandwiched between a pair of electrode layers; a frame that is arranged on an outer periphery portion of the membrane electrode assembly; and a separator that defines a gas flow channel between the separator and the membrane electrode assembly and between the separator and the frame, wherein a diffuser portion which is a part of the gas flow channel, is formed between the separator and the frame, each of the electrode layers includes a metal porous body which is an electrode surface layer and has gas permeability, and the metal porous body has at an end portion thereof, an extension part covering a region corresponding to the diffuser portion of the frame.

DESCRIPTION OF EMBODIMENTS

First Exemplary Embodiment

Figure 1:
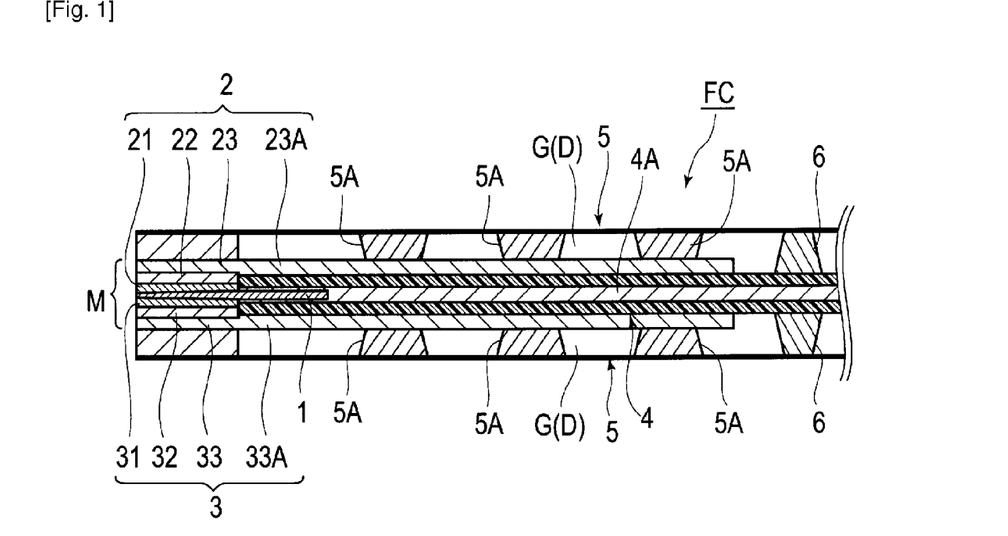
FIG. 1 is a cross-sectional view that illustrates essential parts of a fuel cell according to a first exemplary embodiment of the present invention.

A fuel cell according to the first exemplary embodiment will be described with reference to the drawings below. A fuel cell FC shown in FIGS. 1 to 3 includes a membrane electrode assembly M having a structure where an electrolyte membrane 1 is sandwiched between a pair of electrode layers (cathode layer 2 and anode layer 3), a frame 4 that is arranged on an outer circumference of an end portion of the electrolyte membrane 1 (an outer periphery portion of the membrane electrode assembly M), and separators 5 and 5 each of which defines a gas flow channel G between the corresponding separator 5 and the membrane electrode assembly M and between the corresponding separator 5 and the frame 4. It is noted that FIG. 1 is a sectional view along the line A-A in FIG. 2. Namely, FIG. 1 is the cross-sectional view along a longitudinal direction of the fuel cell FC.

The membrane electrode assembly M is so-called MEA (Membrane Electrode Assembly) in which the electrolyte membrane 1 composed of solid polymer is sandwiched between the cathode layer 2 and the anode layer 3 constituting the pair of electrode layers. As shown in FIG. 1, in the cathode layer 2, a catalyst layer 21, a porous layer 22 (middle layer) and a metal porous body 23 (electrode surface layer) are arranged in this order from a side of the electrolyte membrane 1. The porous layer 22 and the metal porous body 23 function as a gas diffuse layer. In the anode layer 3, a catalyst layer 31, a porous layer (middle layer) 32 and a metal porous body (electrode surface layer) 33 are arranged in this order from the side of the electrolyte membrane 1. The porous layer 32 and the metal porous body 33 function as a gas diffuse layer. Each of the porous layers 22 and 32 may have a multi-layer structure.

Figure 3:
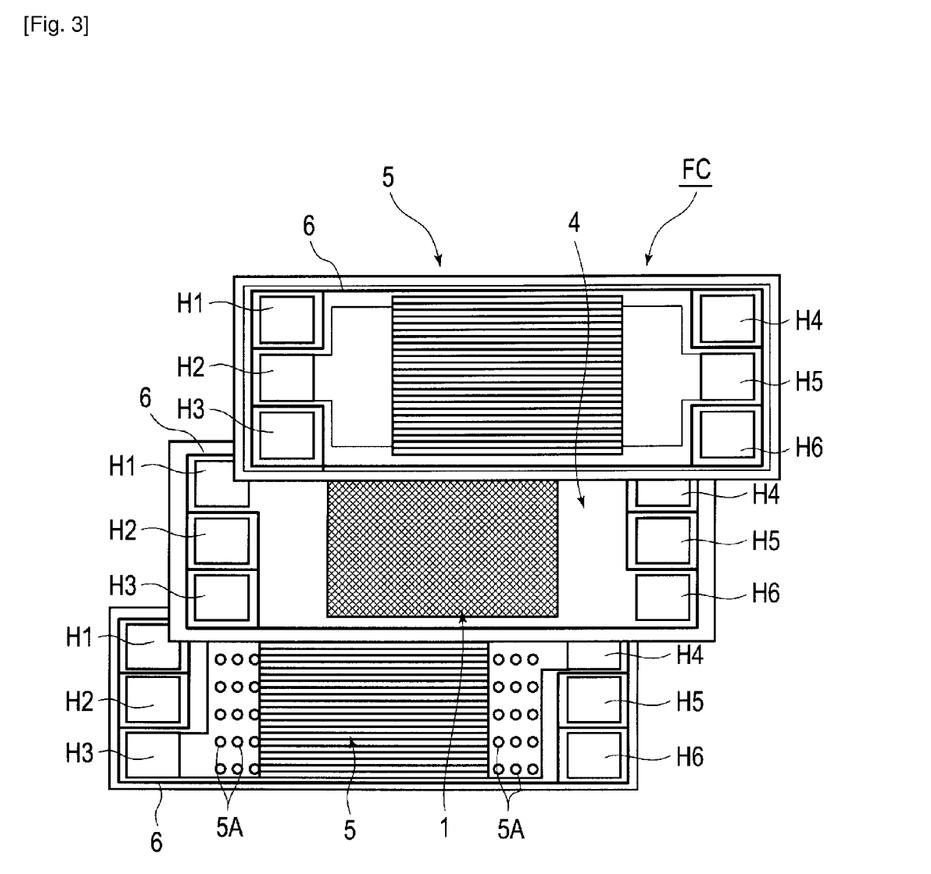
FIG. 3 is a plane view in which the fuel cell illustrated in FIG. 2 is exploded.

The frame 4 is made of resin, supports the membrane electrode assembly M, and functions as a gasket. Polyethylene naphthalate (PEN) can be cited as one example of the resin. As shown in FIG. 3, the frame 4 is formed into a rectangular shape in planar view and integrated with an outer edge of the membrane electrode assembly M. As shown in FIG. 1, the frame 4 is composed of a pair of sheet-shaped materials, which are bound with an adhesion layer 4A, between which the outer circumference of the end portion of the electrolyte membrane 1 is sandwiched.

The frame 4 includes supply holes H1 to H3 for cathode gas (oxygen-containing gas), coolant and anode gas (hydrogen-containing gas) at one short side which is a left side in FIG. 3. The frame 4 includes exhaust holes H4 to H6 for cathode gas, coolant and anode gas at the other short side which is a right side in FIG. 3. It is noted that the positional relation between fluid supply and exhaust can be adequately changed.

The separators 5 and 5 double as power collection body. Each of the separators 5 and 5 is formed into a rectangular shape in planar view, has substantially the same size as the frame 4, and is produced by pressing into shapes a metal plate such as stainless. Each of the separators 5 and 5 has a plurality of elongated protrusions which extend along a long side direction in parallel to one another, on an inner surface of the center part thereof. The gas flow channel G is defined between each separator 5 and the membrane electrode assembly M. Each of the separators 5 and 5 includes supply holes H1 to H3 and exhaust holes H4 to H6 at both short sides, corresponding to the supply holes H1 to H3 and the exhaust holes H4 to H6 of the frame 4. It is noted that the metal porous bodies 23 and 33 are omitted in FIG. 3.

Figure 2:
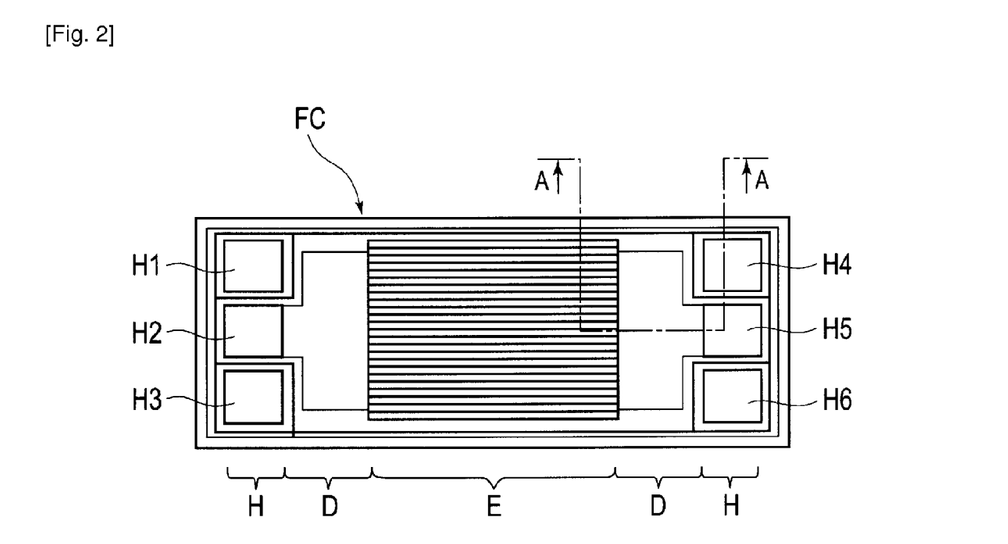
FIG. 2 is a plane view that illustrates the whole structure of the fuel cell illustrated in FIG. 1.

The fuel cell FC is formed by overlapping the separators 5 and 5 on the membrane electrode assembly M and the frame 4. As shown in FIG. 2, the fuel cell FC includes a power generation portion E at the center part thereof in which the membrane electrode assembly M is arranged. The fuel cell FC includes at both sides of the power generation portion E, manifold portions H and H in which the supply holes H1 to H3 and the exhaust holes H4 to H6 for reaction gas are respectively arranged. The fuel cell FC includes diffuser portions D and D, in which flow of reaction gas is controlled, arranged between the manifold portions H and H and the power generation portion E. Namely, the fuel cell FC is configured by forming between the frame 4 and the separators 5 and 5, the diffuser portions D and D which are a part of a gas flow channel G.

In each of the separators 5 and 5, protrusions 5A are arranged in a matrix in a plane, in regions corresponding to the diffuser portions D and D. When a load is put on the fuel cell FC along a thickness direction thereof, the protrusions 5A abut on the frame 4, which prevents the gas flow channel G from being closed.

The fuel cell FC includes seal materials 6 between edges of the frame 4 and each of the separators 5 and 5 and around the supply holes H1 to H3 and the exhaust holes H4 to H6. In a state where a plurality of fuel cells FC is stacked, a seal material 6 is mounted between separators 5 and 5 of adjacent fuel cells FC. In each interlayer, the seal materials 6 separate flow areas of the cathode gas, the coolant and the anode gas from one another to keep gas tight, and have opens at proper parts around circumferential edges of the supply holes H1 to H3 and the exhaust holes H4 to H6 such that respective fluids can flow between these layers.

As described above, the fuel cell FC includes the metal porous bodies 23 and 33, which have gas permeability to function as the gas diffuse layers, positioned on surfaces of the cathode layer 2 and the anode layer 3 constituting the pair of electrode layers. In the fuel cell FC, the metal porous bodies 23 and 33 include at outer circumference sides thereof, extension parts 23A and 33A with which the diffuser portions D and D in the frame 4 is covered.

In the present embodiment, it is required to cover the diffuser portion D of the frame 4 with the extension parts 23A and 33A of the metal porous bodies 23 and 33, and it is not necessary to connect the extension parts 23A and 33A to the frame 4. It is needless to say that an integral structure where the extension parts 23A and 33A are connected to the frame 4 also has the same advantageous effect as the present embodiment. The present embodiment has a structure where the protrusions 5A of the separators 5 and 5 abut on the extension parts 23A and 33A. In the present embodiment, it is required that the protrusions 5A abut on the extension parts 23A and 33A, and it is not necessary to connect the protrusions 5A to the extension parts 23A and 33A. It is noted that the present embodiment allows the protrusions 5A not to abut on the extension parts 23A and 33A. In this case, when the frame 4 deforms due to differential pressure, the protrusions 5A abut on the extension parts 23A and 33A.

The metal porous bodies 23 and 33 are made of at least one of foam metal, expanded metal, punching metal, etching plate, precision pressing processed plate, wire mesh, metal mesh, and metal fine line sintered body. Namely, at least, the metal porous bodies 23 and 33 have gas permeability in a thickness direction thereof.

It is desirable that the metal porous bodies 23 and 33 have gas permeability in an in-plane direction thereof, in addition to the gas permeability in the thickness direction thereof. For example, the metal porous bodies 23 and 33 may be made of foam metal, wire mesh, metal fine line sintered body or the like, so as to have gas permeability in the in-plane direction thereof. Also, the metal porous bodies 23 and 33 may be made by performing sterically-processing in the thickness direction thereof to keep gas permeability in the in-plane direction thereof. In this case, the gas permeability in the in-plane direction can be kept by processing a flat punching metal so as to have a corrugated state in section, for example.

Since the fuel cell FC having the above-described configuration includes the metal porous bodies 23 and 33 positioned on surfaces of the cathode layer 2 and the anode layer 3, the metal porous bodies 23 and 33 receive differential pressure input and steady input loading. Thereby, stress to be applied to the frame 4 is reduced.

In the conventional fuel cell, a differential pressure cycle of gas occurs between the cathode side and the anode side due to driving situation and the like, and the frame 4 in the diffuser portions D and D where a beam in the fuel cell is large in length, is easily affected by differential pressure input and the like. In contrast, even if the differential pressure cycle occurs in the fuel cell FC, the metal porous bodies 23 and 33 reduce stress to be applied to the frame 4, which prevents the frame 4 from deforming. Thereby, the fuel cell FC can sufficiently secure a sectional area of the gas flow channel G to prevent pressure loss of reaction gas from increasing.

Since stress to be applied to the frame 4 is reduced, endurance of the frame 4 increases. If the frame 4 is made thinner, supporting function of the frame 4 for the membrane electrode assembly M is sufficiently kept. This realizes a thin fuel cell.

A fuel cell stack is configured by stacking fuel cells FC. Since the deformation of the frame 4 can be prevented and the sectional area of the gas flow channel G can be secured, the fuel cell stack keeps high-efficiency power generation. Each of the fuel cells FC can be made thinner, which realizes a small and lightweight fuel cell stack. The thin fuel cell stack is suitable for a power source to be mounted on a vehicle such as an automobile.

The fuel cell FC has the structure where the protrusions 5A of the separators 5 and 5 abut on the extension parts 23A and 33A of the metal porous bodies 23 and 33, which prevents the extension parts 23A and 33A and the frame 4 from displacing in the thickness direction thereof. This further increases function for preventing the frame 4 from deforming due to the differential pressure cycle.

In the fuel cell FC, the metal porous bodies 23 and 33 are made of at least one of foam metal, expanded metal, punching metal, etching plate, precision pressing processed plate, wire mesh, metal mesh, and metal fine line sintered body. This can increase function for reducing stress to be applied to the frame 4 using a simple structure.

In the fuel cell FC, the metal porous bodies 23 and 33 have gas permeability in the in-plane direction and the thickness direction thereof. This increases a substantive gas permeability area in the diffuser portions D and D, which realizes further reduction of pressure loss of reaction gas.

Modified Example

Figure 4:
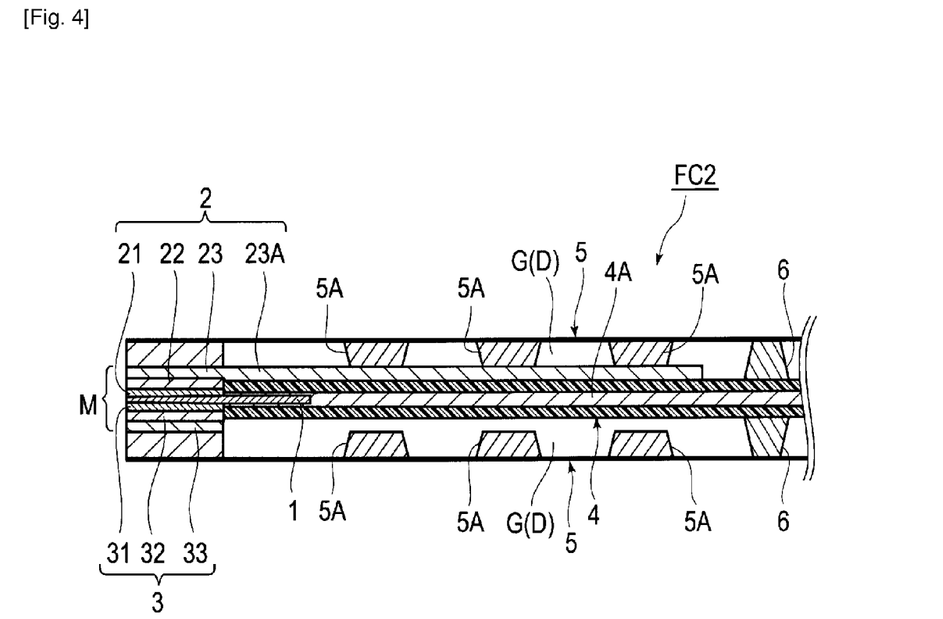
FIG. 4 is a cross-sectional view that illustrates essential parts of a fuel cell according to a modified example of the first exemplary embodiment of the present invention.

FIG. 4 illustrates a fuel cell FC2 according to a modified example of the present embodiment. It is noted that the same configuration part as the fuel cell FC is assigned the same signs and a detailed description thereof is omitted.

The fuel cell FC2 includes the membrane electrode assembly M, the frame 4 that is arranged on the outer periphery portion of the membrane electrode assembly M, and separators 5 and 5 each of which defines the gas flow channel G between the corresponding separator 5 and the membrane electrode assembly M and between the corresponding separator 5 and the frame 4. The diffuser portions D and D which are a part of the gas flow channel G, are formed between the frame 4 and the separators 5 and 5.

The fuel cell FC2 includes the porous layer 22 and 32 and the metal porous bodies 23 and 33 positioned on the surfaces of the cathode layer 2 and the anode layer 3 constituting the pair of electrode layers. The metal porous body 23 of the cathode layer 2 constituting one of the electrode layers includes at the outer periphery side thereof, the extension part 23A which is connected to the frame 4 in a state where a region corresponding to the diffuser portion D in the frame 4 is covered with the extension part 23A. In the fuel cell FC2, the extension part 23A is mounted on the metal porous body 23 positioned on the surface of the cathode layer 2.

The fuel cell FC has the structure where the regions corresponding to the diffuser portions D and D in the frame 4 are covered with the extension parts 23A and 33A of the metal porous bodies 23 and 33. In contrast, the fuel cell FC2 has the structure where (1) the diffuser position D in the frame 4 is covered with the extension part 23A of the metal porous body 23 and (2) the frame 4 is connected to the extension part 23A of the metal porous body 23.

A fuel cell stack may be configured by stacking fuel cells FC2. This fuel cell stack is driven by a certain fuel cell system. In the fuel cell system, there is an anode dead-end system where anode gas flows in one direction from a supply side to an exhaust side. In such a fuel cell system, a supply pressure of the anode gas is caused to pulsate in order to effectively perform the supply of the anode gas and the exhaust of generated water. In this case, the fuel cell system can maintain a pressure of cathode gas substantially constant and set an upper limit pressure and a lower limit pressure of the anode gas exceed the pressure of the cathode gas.

In such a fuel cell system, differential pressure repeatedly occurs between the cathode side and the anode side in the fuel cell FC2. By this differential pressure cycle, the frame 4 corresponding to the regions of the diffuser portions D and D where a beam in the fuel cell FC2 is large in length, is repeatedly deformed.

In order to address this problem, in the fuel cell FC2, the extension part 23A is mounted to the metal porous body 23 of the cathode layer 2 constituting one of the electrode layers, and the extension part 23A is connected to the frame 4. The extension part 23A prevents the fame 4 from deforming. Thereby, the fuel cell FC2 can have the same function effect as the fuel cell FC.

In the fuel cell FC2, the extension part 23A is connected to the frame 4. Thus, the extension part is mounted to one of electrode layers, which provides a certain effect to prevent the frame 4 from deforming. It is desirable that the extension part is mounted to one metal porous body in one electrode layer positioned in one of the cathode side and the anode side having a gas pressure lower than the other.

In a case where the extension part is mounted to one metal porous body in one electrode layer positioned in one of the cathode side and the anode side having a gas pressure higher than the other, the protrusions 5A of the corresponding separator 5 abut on the fame 4 to generate creep-deformation according to characteristics of the frame 4. In contrast, in a case where the extension part is mounted to one metal porous body in one electrode layer positioned in one of the cathode side and the anode side having a gas pressure lower than the other, creep-deformation is generated according to characteristics of the metal porous body, which reduces displacement of the frame 4 and the extension part toward the low pressure side. Namely, the deformation is structurally prevented.

In view of the above, in the fuel cell FC2, the extension part is mounted to one metal porous body in one electrode layer positioned in one of the cathode side and the anode side having a gas pressure lower than the other. In a case where the fuel cell FC2 is applied to the above-described fuel cell system, the extension part 23A is mounted to the metal porous body 23 in the cathode layer 2 positioned in the cathode side having a gas pressure lower than the anode side. Thereby, the fuel cell FC2 surely prevents the frame 4 from deforming due to differential pressure of gas between the cathode side and the anode side. As well as the fuel cell FC, the fuel cell FC2 increases the endurance and the power generation function, realizes a thin fuel cell, and contributes to realization of a small and lightweight fuel cell stack.

Second Exemplary Embodiment

Figure 5A:
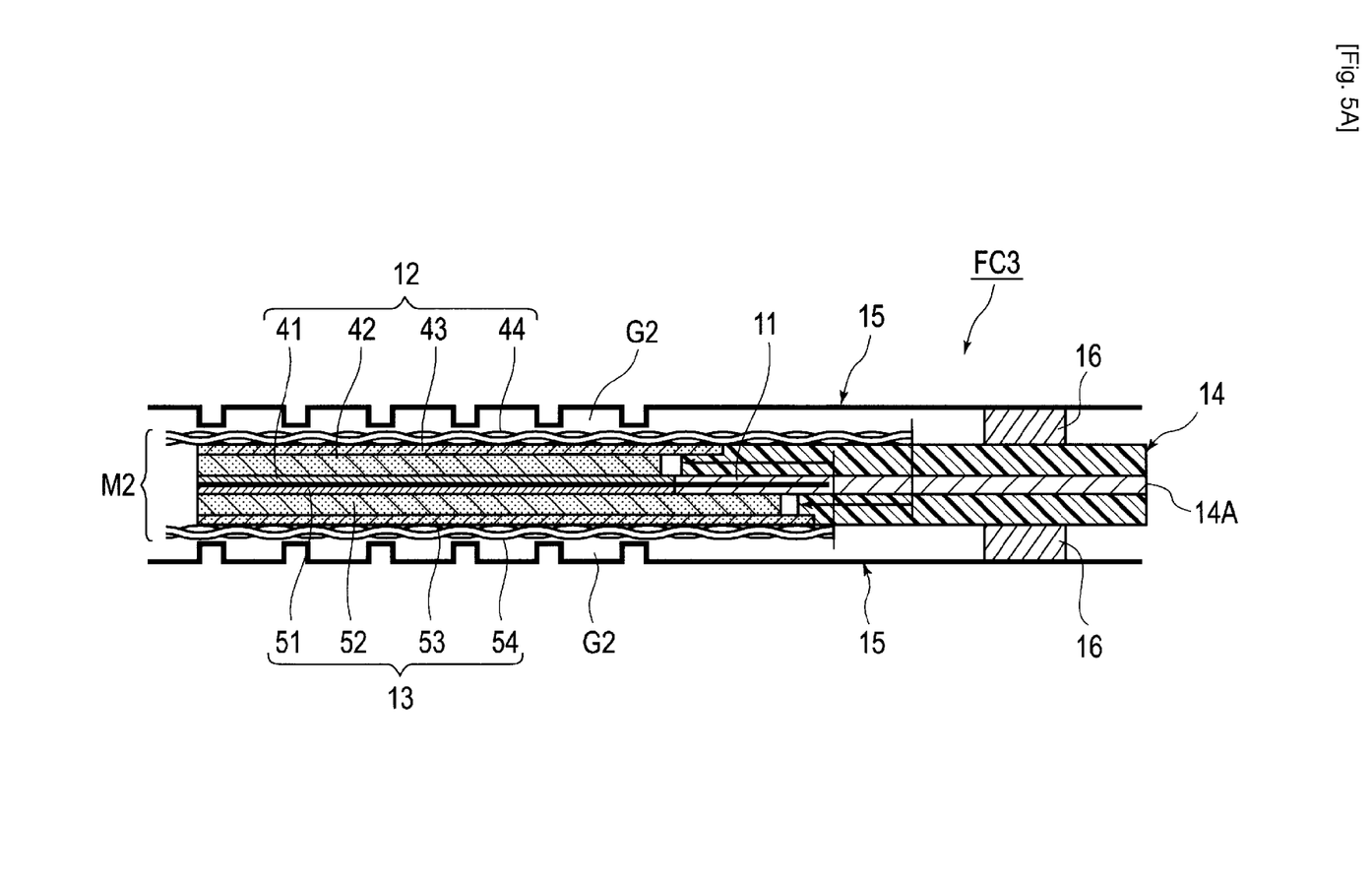
FIG. 5A is a cross-sectional view that illustrates essential parts of a fuel cell according to a second exemplary embodiment of the present invention.

A fuel cell according to the second exemplary embodiment will be described with reference to the drawings below. A fuel cell FC3 shown in FIGS. 5A to 7 includes a membrane electrode assembly M2 having a structure where an electrolyte membrane 11 is sandwiched between a pair of electrode layers (cathode layer 12 and anode layer 13), a frame 14 that is arranged on an outer circumference of an end portion of the electrolyte membrane 11 (an outer periphery portion of the membrane electrode assembly M2), and separators 15 and 15 each of which defines a gas flow channel G2 between the corresponding separator 15 and the membrane electrode assembly M2 and between the corresponding separator 15 and the frame 14. It is noted that FIG. 5A is a sectional view along the line B-B in FIG. 6. Namely, FIG. 5A is the cross-sectional view along a lateral direction of the fuel cell FC3.

The membrane electrode assembly M2 is so-called MEA (Membrane Electrode Assembly) in which the electrolyte membrane 11 composed of solid polymer is sandwiched between the cathode layer 12 and the anode layer 13 constituting the pair of electrode layers. As shown in FIG. 5A, in the cathode layer 12, a catalyst layer 41, a first carbon porous body 42, a second carbon porous body 43 and a metal porous body 44 are arranged in this order from a side of the electrolyte membrane 11. The first carbon porous body 42 and the second carbon porous body 43 are a middle layer and function as a gas diffuse layer. The metal porous body 44 is an electrode surface layer. In the anode layer 13, a catalyst layer 51, a first carbon porous body 52, a second carbon porous body 53 and a metal porous body 54 are arranged in this order from a side of the electrolyte membrane 11. The first carbon porous body 52 and the second carbon porous body 53 are a middle layer and function as a gas diffuse layer. The metal porous body 54 is an electrode surface layer.

Figure 7:
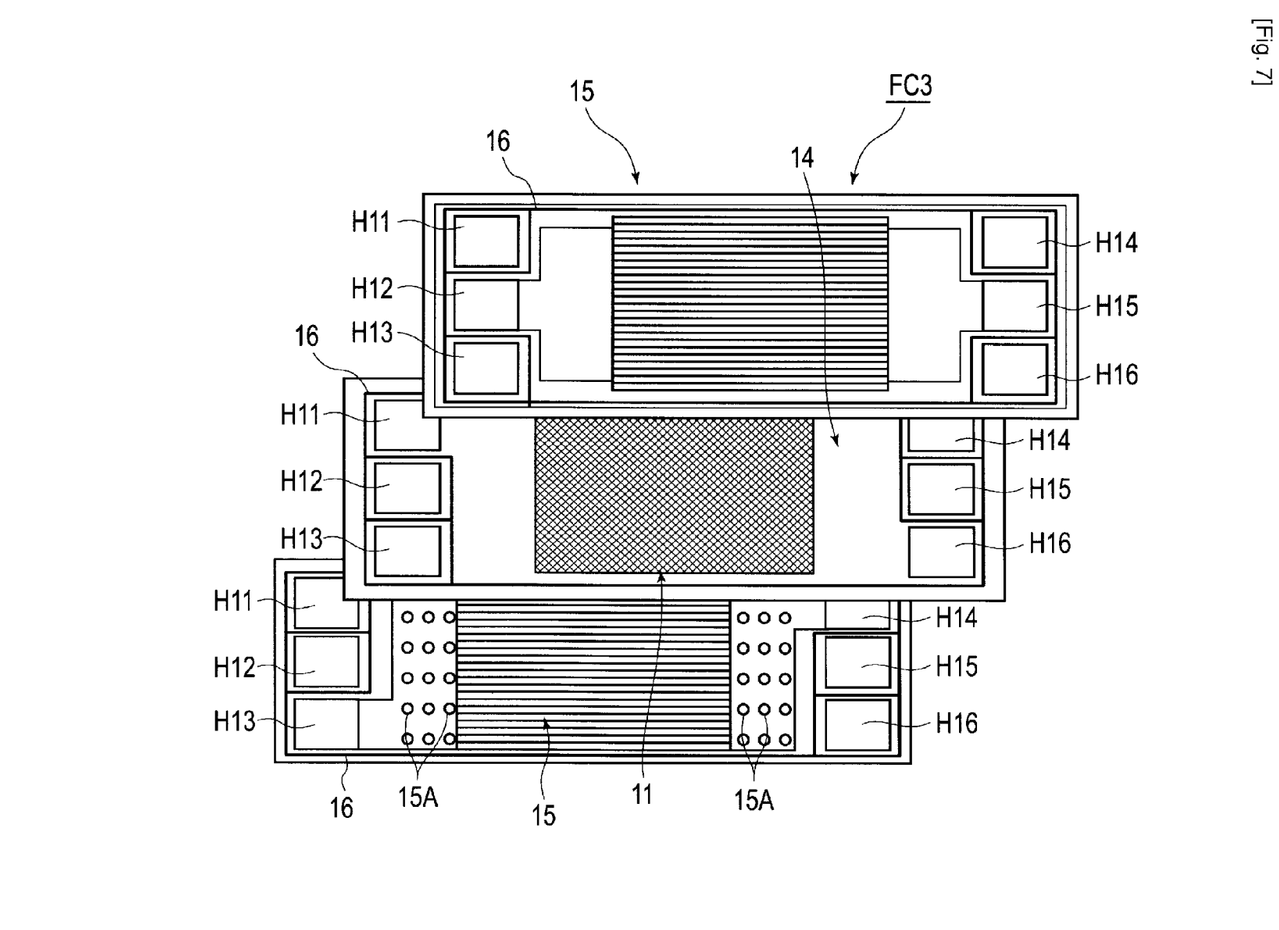
FIG. 7 is a plane view in which the fuel cell illustrated in FIG. 6 is exploded.

The frame 14 is made of resin, supports the membrane electrode assembly M2, and functions as a gasket. Polyethylene naphthalate (PEN) can be cited as one example of the resin. As shown in FIG. 7, the frame 14 is formed into a rectangular shape in planar view and integrated with an outer circumference of the electrolyte membrane 11. As shown in FIG. 5A, the frame 14 is composed of a pair of sheet-shaped materials, which are bound with an adhesion layer 14A, between which the outer circumference of the end portion of the electrolyte membrane 11 is sandwiched.

The frame 14 includes supply holes H11 to H13 for cathode gas (oxygen-containing gas), coolant and anode gas (hydrogen-containing gas) at one short side which is a left side in FIG. 7. The frame 14 includes exhaust holes H14 to H16 for cathode gas, coolant and anode gas at the other short side which is a right side in FIG. 7. It is noted that the positional relation between fluid supply and exhaust can be adequately changed.

The separators 15 and 15 double as power collection body. Each of the separators 15 and 15 is formed into a rectangular shape in planar view, has substantially the same size as the frame 14, and is produced by pressing into shapes a metal plate such as stainless. Each of the separators 15 and 15 has a plurality of elongated protrusions which extend along a long side direction in parallel to one another, on an inner surface of the center part thereof. The gas flow channel G2 is defined between each separator 15 and the membrane electrode assembly M2. Each of the separators 15 and 15 includes supply holes H11 to H13 and exhaust holes H14 to H16 at both short sides, corresponding to the supply holes H11 to H13 and the exhaust holes H14 to H16 of the frame 14. It is noted that the metal porous bodies 44 and 54 are omitted in FIG. 7.

Figure 6:
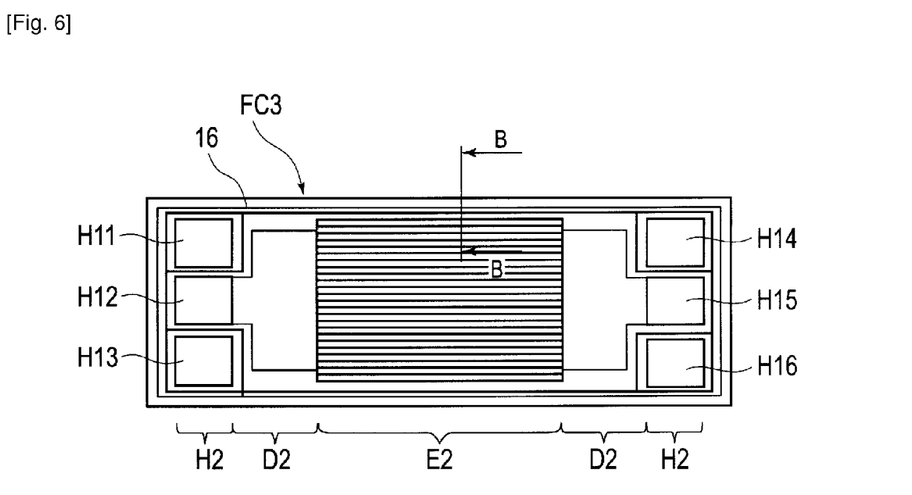
FIG. 6 is a plane view that illustrates the whole structure of the fuel cell illustrated in FIG. 5A.

The fuel cell FC3 is formed by overlapping the separators 15 and 15 on the membrane electrode assembly M2 and the frame 14. As shown in FIG. 6, the fuel cell FC3 includes a power generation portion E2 at the center part thereof in which the membrane electrode assembly M2 is arranged. The fuel cell FC3 includes at both sides of the power generation portion E2, manifold portions H2 and H2 in which the supply holes H11 to H13 and the exhaust holes H14 to H16 for reaction gas are respectively arranged. The fuel cell FC3 includes diffuser portions D2 and D2, in which flow of reaction gas is controlled, arranged between the manifold portions H2 and H2 and the power generation portion E2. Namely, the fuel cell FC3 is configured by forming between the frame 14 and the separators 15 and 15, the diffuser portions D2 and D2 which are a part of a gas flow channel G2.

The fuel cell FC3 includes seal materials 16 between edges of the frame 14 and each of the separators 15 and 15 and around the supply holes H11 to H13 and the exhaust holes H14 to H16. In a state where a plurality of fuel cells FC3 is stacked, a seal material 16 is mounted between separators 15 and 15 of adjacent fuel cells FC3. In each interlayer, the seal materials 16 separate flow areas of the cathode gas, the coolant and the anode gas from one another to keep gas tight, and have opens at proper parts around circumferential edges of the supply holes H11 to H13 and the exhaust holes H14 to H16 such that respective fluids can flow between these layers.

As shown in FIG. 5A, in the fuel cell FC3, end parts (outer circumference part) of the metal porous bodies 44 and 54 in the cathode layer 12 and the anode layer 13 extend on surfaces of the frame 14. In the fuel cell FC3, end parts of the first carbon porous bodies 42 and 52 in the cathode layer 12 and the anode layer 13 have an offset formation in which they are displaced in an in-plane direction (horizontal direction in FIG. 5A). The end part of the first carbon porous body 42 (or 52) in the cathode layer 12 (or the anode layer 13) is arranged at an inward side (left side in FIG. 5A) with respect to the end part of the metal porous body 54 (or 44) in the anode layer 13 (or the cathode layer 12). In the fuel cell FC3, the end parts of the second carbon porous bodies 43 and 53 contact with the frame 14, which closes gaps between the first carbon porous bodies 42 and 52 and the frame 14.

In FIG. 5A, the end part of the first carbon porous body 52 in the anode layer 13 is offset outward (right side in FIG. 5A) with respect to the end part of the first carbon porous body 42 in the cathode layer 12. As shown in arrows in FIG. 5A, the end part of the first carbon porous body 42 (or 52) in the cathode layer 12 (or the anode layer 13) is arranged at an inward side (left side in FIG. 5A) with respect to the end part of the metal porous body 54 (or 44) in the anode layer 13 (or the cathode layer 12). Namely, the fuel cell FC3 is configured such that the metal porous bodies 44 and 54 are always present on the opposite side of the end parts of the first carbon porous bodies 42 and 52.

Each of the first and second carbon bodies 42, 43, 52 and 53 is formed by carbon material such as carbon cross or carbon paper, a metal porous body to which carbon particles are applied, or sheet-like carbon particles, for example. Each of the first and second carbon bodies 42, 43, 52 and 53 has gas permeability in a thickness direction and an in-plane direction thereof.

The metal porous bodies 44 and 54 are made of at least one of foam metal, expanded metal, punching metal, etching plate, precision pressing processed plate, wire mesh, metal mesh, and metal fine line sintered body. Namely, at least, the metal porous bodies 44 and 54 have gas permeability in a thickness direction thereof. The metal porous bodies 44 and 54 can have gas permeability in an in-plane direction thereof depending on a quality of material or an adequate formation thereof.

Figure 5B:
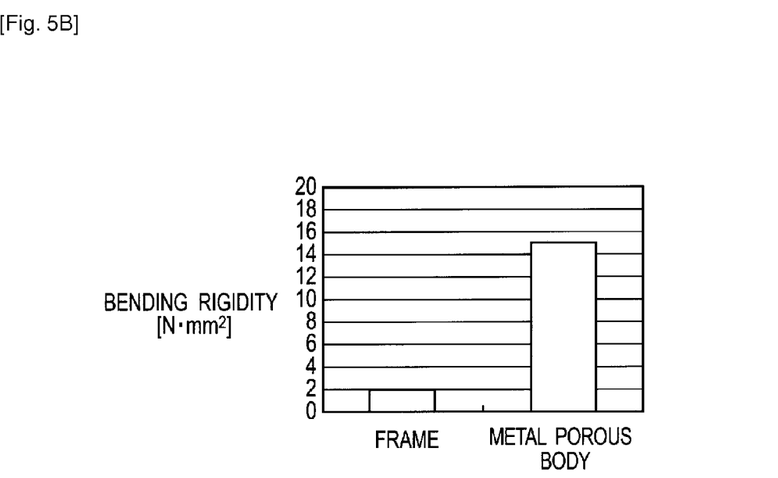
FIG. 5B is a graph that represents bending rigidity of a frame and bending rigidity of a metal porous body according to the second exemplary embodiment of the present invention.

As shown in FIG. 5B, each of the metal porous bodies 44 and 54 has bending elastic modulus (bending rigidity) larger than one of the frame 14. Although the end parts of the metal porous bodies 44 and 54 extend on surfaces of the frame 14, the end parts of the metal porous bodies 44 and 54 may not be connected to the frame 14.

In the fuel cell FC3, a layer stack membrane composed of the electrolyte membrane 11 and the catalyst layers 41 and 51 is exposed in gaps between the first carbon porous bodies 42 and 52 and the frame 14. However, the end parts of the second carbon porous bodies 43 and 53 and the end parts of the metal porous bodies 44 and 54 have the above-described arrangement, which prevents the layer stack membrane from being directly exposed and reduces stress to be applied to the electrolyte membrane 11 using rigidity of the metal porous bodies 44 and 54.

Thereby, even if differential pressure occurs between the cathode side and the anode side due to driving situation and the like, the fuel cell FC3 can prevent the frame 14 from deforming, which avoids stress concentration of the electrolyte membrane 11 in gaps between the first carbon porous bodies 42 and 52 and the frame 14. This prevents damage of the electrolyte membrane 11 from occurring and realizes increase of endurance.

In the fuel cell FC3, since the metal porous bodies 44 and 54, which have bending elastic modulus (bending rigidity) larger than one of the frame 14, are employed, the rigidity of the frame 14 is or the rigidities of the frame 14 and the first and second carbon porous bodies 42, 43, 52 and 53 are complemented with the rigidities of the metal porous bodies 44 and 54. Thereby, the frame 14, the first and second carbon porous bodies (gas diffuse layer) 42, 43, 52 and 53 becomes thin, which realizes a thin fuel cell.

A fuel cell stack is configured by stacking fuel cells FC3. Since the stress of the electrolyte membrane 11 is reduced and the endurance of the electrolyte membrane 11 is increased, the fuel cell stack can enhance the reliability. Each of the fuel cells FC3 can be made thinner, which realizes a small and lightweight fuel cell stack. The thin fuel cell stack is suitable for a power source to be mounted on a vehicle such as an automobile.

FIGS. 8 to 11 are cross-sectional views that illustrate essential parts of fuel cells according to first to fourth modified examples of the present embodiment. It is noted that the same configuration part as the fuel cell FC3 is assigned the same signs and a detailed description thereof is omitted. It is noted that FIGS. 8 to 11 are sectional views along the line B-B in FIG. 6.

First Modified Example

Figure 8:
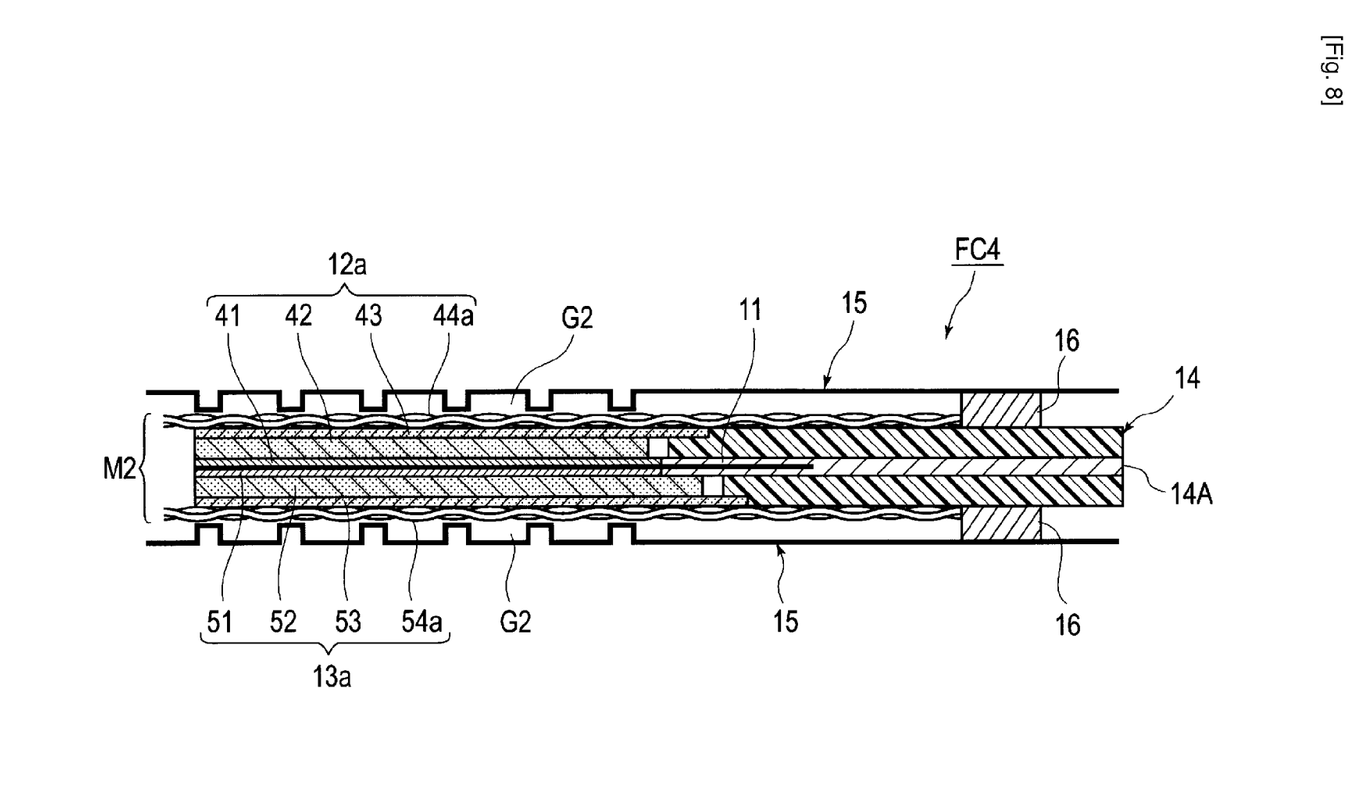
FIG. 8 is a cross-sectional view that illustrates essential parts of a fuel cell according to a first modified example of the second exemplary embodiment of the present invention.

In a fuel cell FC4 shown in FIG. 8, each seal material 16 is sandwiched between an outer periphery portion of the frame 14 and an outer periphery portion of each separator 15 as well as the fuel cell FC3, and the end portions of the metal porous bodies 44a and 54a extend to the seal materials 16.

The fuel cell FC4 has the same function and advantageous effect as the fuel cell FC3, and the rigidity of the frame 14 is more sufficiently complemented by the metal porous bodies 44a and 54a which are overlaid on almost the whole surface of the frame 14. Thereby, even if differential pressure between a cathode 12a side and an anode 13a side, the fuel cell FC4 can prevent the frame 14 from deforming, which avoids stress concentration of the electrolyte membrane 11 in gaps between the first carbon porous bodies 42 and 52 and the frame 14. This prevents damage of the electrolyte membrane 11 from occurring and realizes increase of endurance.

Second Modified Example

Figure 9:
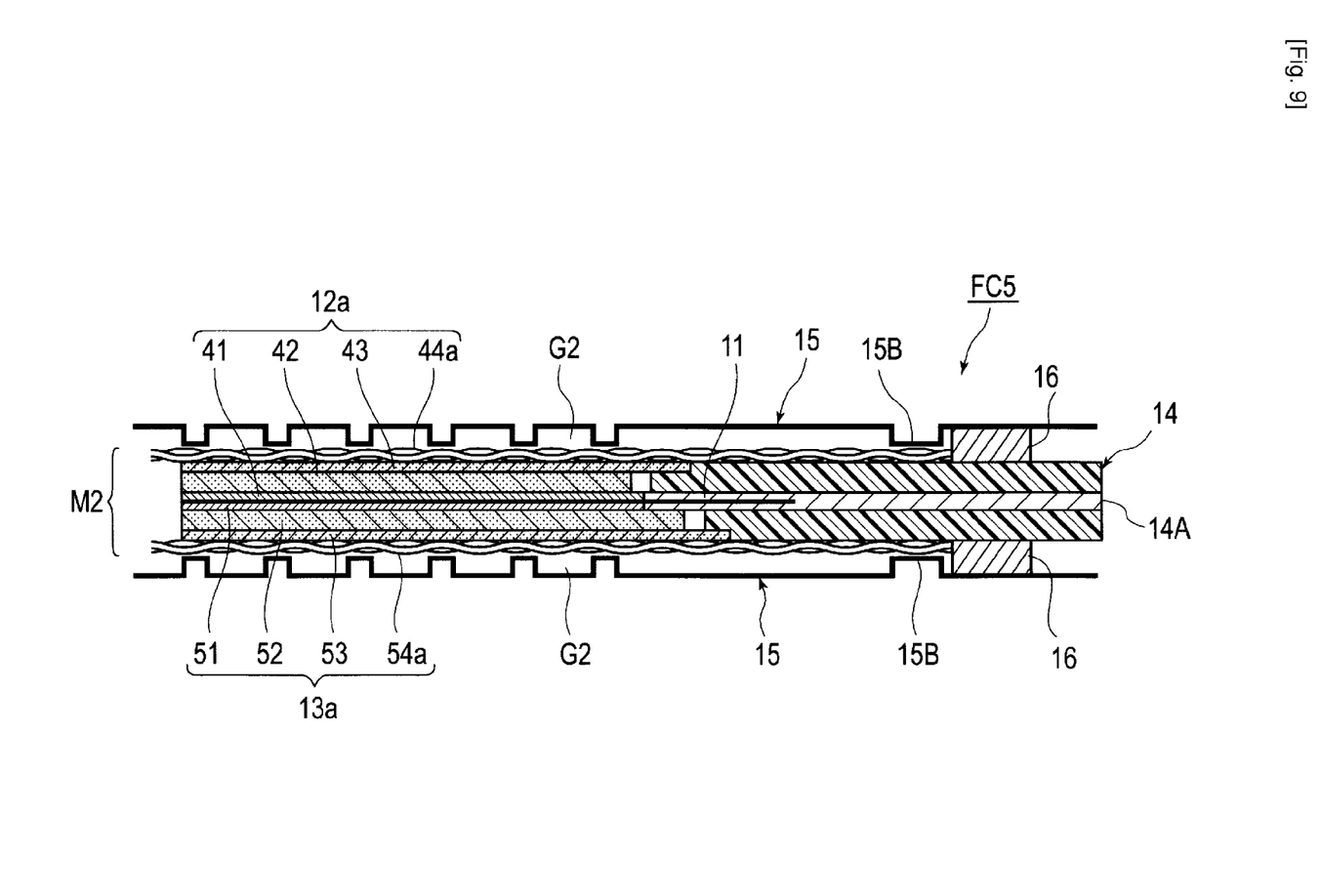
FIG. 9 is a cross-sectional view that illustrates essential parts of a fuel cell according to a second modified example of the second exemplary embodiment of the present invention.

In a fuel cell FC5 shown in FIG. 9, outer periphery portions of the metal porous bodies 44a and 54a are secured by protrusion portions 15B and 15B which are mounted to inner sides of the separators 15 and 15. A gas flow channel G2 is formed between each separator 15 and the membrane electrode assembly M2. In order to maintain a thickness (height) of the gas flow channel G2, each separator 15 has a concavo-convex shape viewed from cross-section thereof and protrusion portions 15A contacts the membrane electrode assembly M2. In the fuel cell FC5, the protrusion portions (ribs) 15B and 15B are mounted to the separators 15 and 15 at the inner sides with respect to the seal materials 16 and 16. The protrusion portions 15B and 15B are pressure-contacted to the metal porous bodies 44a and 54a, which secures the metal porous bodies 44a and 54a.

The fuel cell FC5 has the same function and advantageous effect as the fuel cell FC4, and the rigidities of the metal porous bodies 44a and 54a which are overlaid on surfaces of the frame 14 is increased. Thereby, the rigidity of the frame 14 is more sufficiently complemented, and even if differential pressure between a cathode 12a side and an anode 13a side occurs, the fuel cell FC5 can prevent the frame 14 from deforming, which avoids stress concentration of the electrolyte membrane 11 in gaps between the first carbon porous bodies 42 and 52 and the frame 14. This prevents damage of the electrolyte membrane 11 from occurring and realizes further increase of endurance.

Third Modified Example

Figure 10:
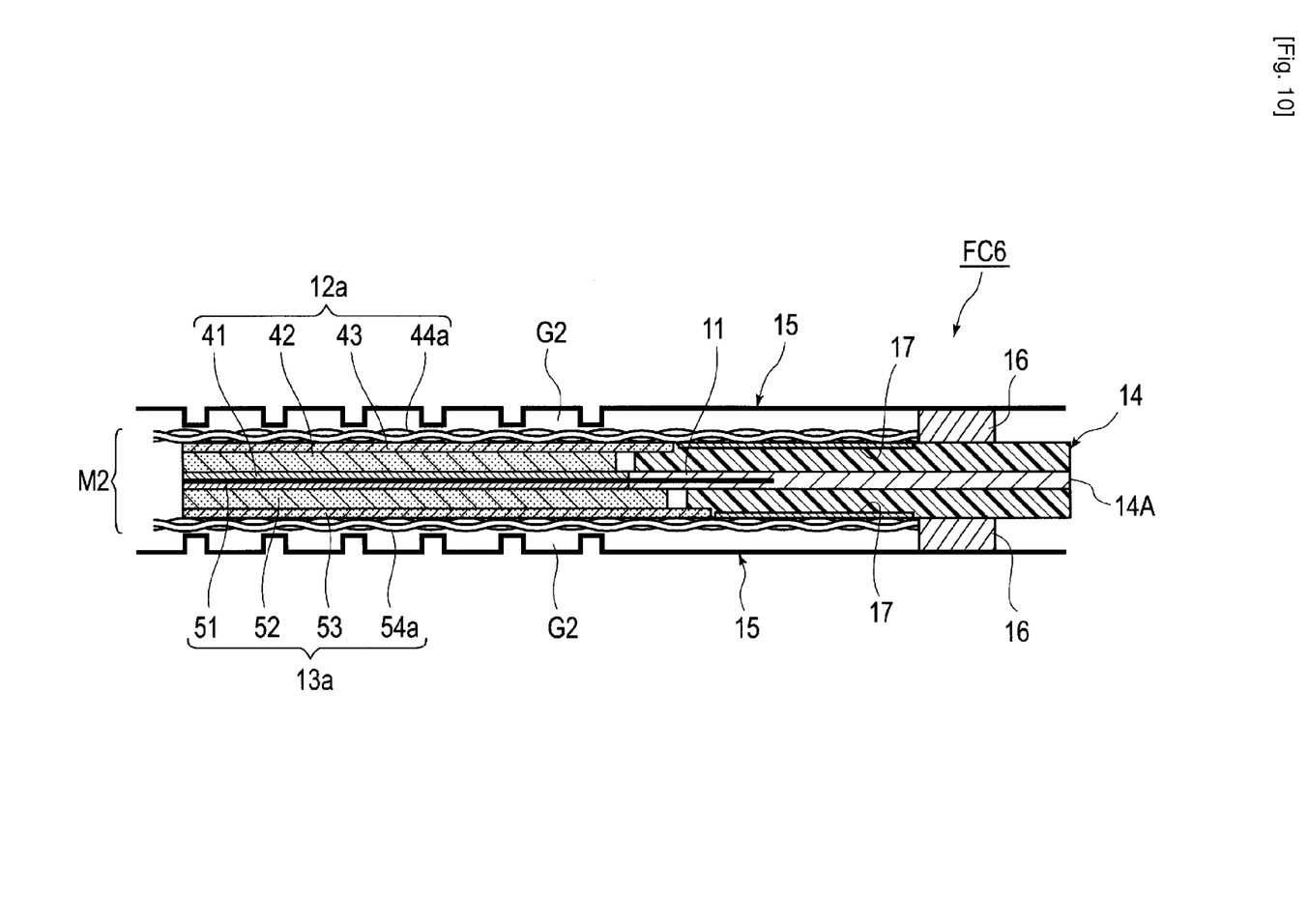
FIG. 10 is a cross-sectional view that illustrates essential parts of a fuel cell according to a third modified example of the second exemplary embodiment of the present invention.

In a fuel cell FC6 shown in FIG. 10, the outer periphery portions of the metal porous bodies 44a and 54a are connected to the frame 14. In the present modified example, the metal porous bodies 44a and 54a are connected to the frame 14 via adhesion layers 17 and 17. It is needless to say that adhesion means other than the adhesion layers 17 and 17 may be employed.

The fuel cell FC6 has the same function and advantageous effect as the fuel cell FC4, and the rigidities of the metal porous bodies 44a and 54a which are overlaid on surfaces of the frame 14 is increased. Thereby, the rigidity of the frame 14 is more sufficiently complemented, and even if differential pressure between a cathode 12a side and an anode 13a side occurs, the fuel cell FC6 can prevent the frame 14 from deforming, which avoids stress concentration of the electrolyte membrane 11 in gaps between the first carbon porous bodies 42 and 52 and the frame 14. This prevents damage of the electrolyte membrane 11 from occurring and realizes further increase of endurance. Further, since the frame 14 and the metal porous bodies 44a and 54a are integrated, assembly accuracy is increased, which contributes to increase in productivity and reduction of cost thereof.

Fourth Modified Example

Figure 11:
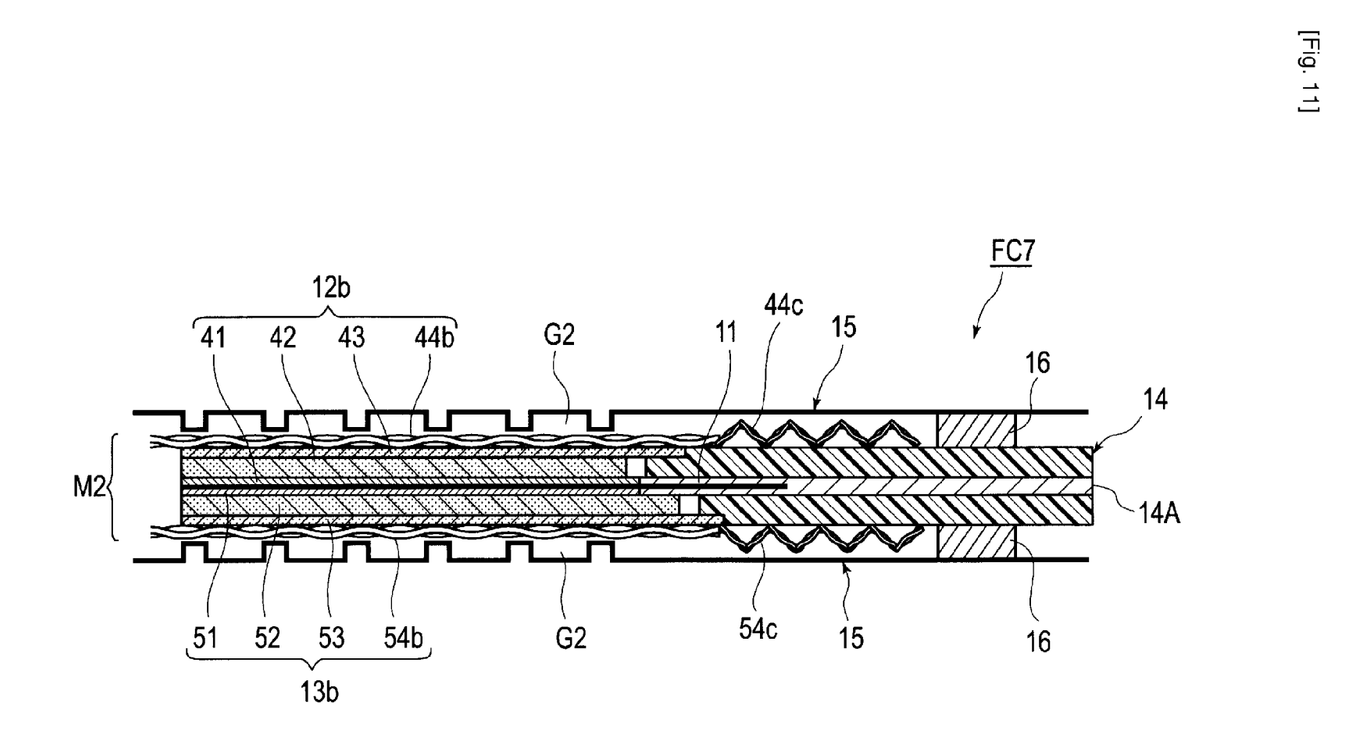
FIG. 11 is a cross-sectional view that illustrates essential parts of a fuel cell according to a fourth modified example of the second exemplary embodiment of the present invention.

In a fuel cell FC7 shown in FIG. 11, outer periphery portions of the metal porous bodies 44b and 54b are sterically-formed in a thickness direction thereof. The outer periphery portions of the metal porous bodies 44b and 54b are sterical-formation portions 44c and 54c. The sterical-formation portions 44c and 54c have a wave-like shape viewed from cross-section thereof. The sterical-formation portions 44c and 54c are made by press processing or the like. The sterical-formation portions 44c and 54c may have a rib-like shape, a dot-like shape or the like viewed from the cross section thereof, which protrudes in the thickness direction, other than the wave-like shape.

The fuel cell FC7 has the same function and advantageous effect as the fuel cell FC3, and the rigidities of the metal porous bodies 44b and 54b which are overlaid on surfaces of the frame 14 is increased by the sterical configuration thereof (that is, shape effect can be obtained). Thereby, the rigidity of the frame 14 is more sufficiently complemented, and even if differential pressure between a cathode 12b side and an anode 13b side occurs, the fuel cell FC7 can prevent the frame 14 from deforming, which avoids stress concentration of the electrolyte membrane 11 in gaps between the first carbon porous bodies 42 and 52 and the frame 14. This prevents damage of the electrolyte membrane 11 from occurring and realizes further increase of endurance.

The fuel cell according to the present invention is not limited to the above described embodiments. The shape of the fuel cell, the shape and material of each component of the fuel cell, and details of structure of the fuel cell may be adequately modified without departing from the scope of the invention. Also, the structure of the fuel cell FC1 or FC2 of the first exemplary embodiment may be combined with the structure of the fuel cell FC3, FC4, FC5, FC6 or FC7 of the second exemplary embodiment.

This application is based on a prior Japanese Patent Applications No. 2012-058471 (filed on Mar. 15, 2012) and No. 2012-061982 (filed on Mar. 19, 2012 in Japan). The entire contents of the Japanese Patent Applications No. 2012-058471 and No. 2012-061982 from which priority is claimed are incorporated herein by reference, in order to take some protection against translation errors or omitted portions.

REFERENCE SIGNS LIST

D1, D2 diffuser portion
FC to FC7 fuel cell
G1, G2 gas flow channel
M1, M2 membrane electrode assembly
1, 11 electrolyte membrane
2, 12, 12a, 12b cathode layer
3, 13, 13a, 13b anode layer
4, 14 frame
5, 15 separator
23, 33, 44, 44a, 44b, 54, 54a, 54b metal porous body
23A, 33A extension part
42, 52 first carbon porous body
43, 53 second carbon porous body

The invention claimed is:
1. A fuel cell comprising:
 a membrane electrode assembly in which an electrolyte membrane is sandwiched between a pair of electrode layers;
 a frame that is arranged on an outer periphery portion of the membrane electrode assembly; and
 a separator that defines a gas flow channel between the separator and the membrane electrode assembly and between the separator and the frame,
 wherein
 a diffuser portion which is a part of the gas flow channel, is formed between the separator and the frame,
 each of the electrode layers includes a metal porous body which is an electrode surface layer and has gas permeability, and
 both metal porous bodies respectively have at end portions thereof, extension parts covering a region corresponding to the diffuser portion of the frame.

2. A fuel cell comprising:
 a membrane electrode assembly in which an electrolyte membrane is sandwiched between a pair of electrode layers;
 a frame that is arranged on an outer periphery portion of the membrane electrode assembly; and a separator that defines a gas flow channel between the separator and the membrane electrode assembly and between the separator and the frame, wherein a diffuser portion which is a part of the gas flow channel, is formed between the separator and the frame, each of the electrode layers includes a metal porous body which is an electrode surface layer and has gas permeability, the metal porous body in one of the electrode layers which has a gas pressure lower than the other of the electrode layers, has at an end portion thereof, an extension part covering a region corresponding to the diffuser portion of the frame, and the extension part is connected to the frame.

3. The fuel cell according to claim 1, wherein the metal porous body is made of at least one of foam metal, expanded metal, punching metal, etching plate, precision pressing processed plate, wire mesh, metal mesh, or metal fine line sintered body.

4. The fuel cell according to claim 1, wherein the metal porous body has gas permeability in a thickness direction and an in-plane direction thereof.

5. The fuel cell according to claim 1, wherein each of the electrode layers further includes a carbon porous body which is a middle layer, end parts of the carbon porous bodies in the electrode layers have an offset formation in which the end parts are displaced in an in-plane direction thereof, and the end part of the carbon porous body in one electrode layer is arranged at an inward side with respect to the end part of the metal porous body in the other electrode layer.

6. The fuel cell according to claim 5, wherein the metal porous body has a bending elastic modulus larger than a bending elastic modulus of the frame.

7. The fuel cell according to claim 5, wherein a seal material is mounted between an outer periphery portion of the frame and an outer periphery portion of the separator, and an end portion of the metal porous body extends to the seal material.

8. The fuel cell according to claim 5, wherein an outer periphery portion of the metal porous body is secured by a protrusion portion mounted to an inner side of the separator.

9. The fuel cell according to claim 5, wherein an outer periphery portion of the metal porous body is connected to the frame.

10. The fuel cell according to claim 5, wherein an outer periphery portion of the metal porous body is sterically-formed in a thickness direction thereof.

11. A fuel cell stack comprising:

a plurality of fuel cells each recited in claim 1, that is stacked.

12. The fuel cell according to claim 2, wherein the metal porous body is made of at least one of foam metal, expanded metal, punching metal, etching plate, precision pressing processed plate, wire mesh, metal mesh, or metal fine line sintered body.

13. The fuel cell according to claim 2, wherein the metal porous body has gas permeability in a thickness direction and an in-plane direction thereof.

14. The fuel cell according to claim 2, wherein each of the electrode layers further includes a carbon porous body which is a middle layer, end parts of the carbon porous bodies in the electrode layers have an offset formation in which the end parts are displaced in an in-plane direction thereof, and the end part of the carbon porous body in one electrode layer is arranged at an inward side with respect to the end part of the metal porous body in the other electrode layer.

15. The fuel cell according to claim 14, wherein the metal porous body has a bending elastic modulus larger than a bending elastic modulus of the frame.

16. The fuel cell according to claim 14, wherein a seal material is mounted between an outer periphery portion of the frame and an outer periphery portion of the separator, and an end portion of the metal porous body extends to the seal material.

17. The fuel cell according to claim 14, wherein an outer periphery portion of the metal porous body is secured by a protrusion portion mounted to an inner side of the separator.

18. The fuel cell according to claim 14, wherein an outer periphery portion of the metal porous body is connected to the frame.

19. The fuel cell according to claim 14, wherein an outer periphery portion of the metal porous body is sterically-formed in a thickness direction thereof.

20. A fuel cell stack comprising:

a plurality of fuel cells each recited in claim 2, that is stacked.

* * * * *